United States Patent [19]

Cliff et al.

[11] Patent Number: 4,713,656

[45] Date of Patent: Dec. 15, 1987

[54] MULTI-PROGRAMMED DATA PROCESSING SYSTEM WITH FACILITY FOR INSPECTING STATE OF BACKGROUND PROGRAM

[75] Inventors: John F. Cliff, Bracknell; Robert R. Walton, Woking, both of England

[73] Assignee: International Computers Limited, London, England

[21] Appl. No.: 789,323

[22] Filed: Oct. 21, 1985

[30] Foreign Application Priority Data

Nov. 10, 1984 [GB] United Kingdom ............... 8428443

[51] Int. Cl.$^4$ .................................................. G06F 3/14
[52] U.S. Cl. ................................... 340/723; 364/900; 340/724; 340/721; 340/712
[58] Field of Search ... 364/200 MS File, 900 MS File; 340/707, 709, 712, 714, 798, 799, 723, 721, 724, 747

[56] References Cited

U.S. PATENT DOCUMENTS

| | | | |
|---|---|---|---|
| 4,079,449 | 3/1978 | Mercurio et al. | 364/200 |
| 4,200,869 | 4/1980 | Murayama et al. | 340/723 |
| 4,484,302 | 11/1984 | Cason et al. | 364/900 |
| 4,550,386 | 11/1985 | Hirosawa et al. | 364/900 |
| 4,556,954 | 12/1985 | Advani et al. | 364/900 |
| 4,586,035 | 4/1986 | Baker et al. | 340/712 |
| 4,611,306 | 9/1986 | Crehan et al. | 364/900 |
| 4,641,262 | 2/1987 | Bryan et al. | 364/900 |
| 4,670,752 | 6/1987 | Marcoux | 340/721 |

OTHER PUBLICATIONS

Macintosh User's Manual, 1983, pp. 13–41, 54–75, 87–90, 99–108.

*Primary Examiner*—Gary V. Harkcom
*Assistant Examiner*—Randy W. Lacasse
*Attorney, Agent, or Firm*—Lee, Smith & Zickert

[57] ABSTRACT

A data processing system that can execute a plurality of programs concurrently and has a display screen for displaying data associated with any one of the programs. Each program maintains display screen data indicating the current status of the program. The system maintains a REVIEW menu containing a list of the programs that have display screen data available. When a REVIEW key is pressed, the REVIEW menu is displayed. By pressing a further key, one of the listed programs can then be selected, and its display screen data is displayed on the screen. When the key is released, the information that was being displayed prior to operation of the REVIEW key is restored to the screen. A RESUME menu lists programs that are currently in a background mode, and can be called up by pressing a RESUME key, allowing one of those programs to be put into a foreground mode in which it has access to the screen. Another menu lists programs that are available for execution and can be called up by pressing a START key, allowing one to be selected for execution.

6 Claims, 5 Drawing Figures

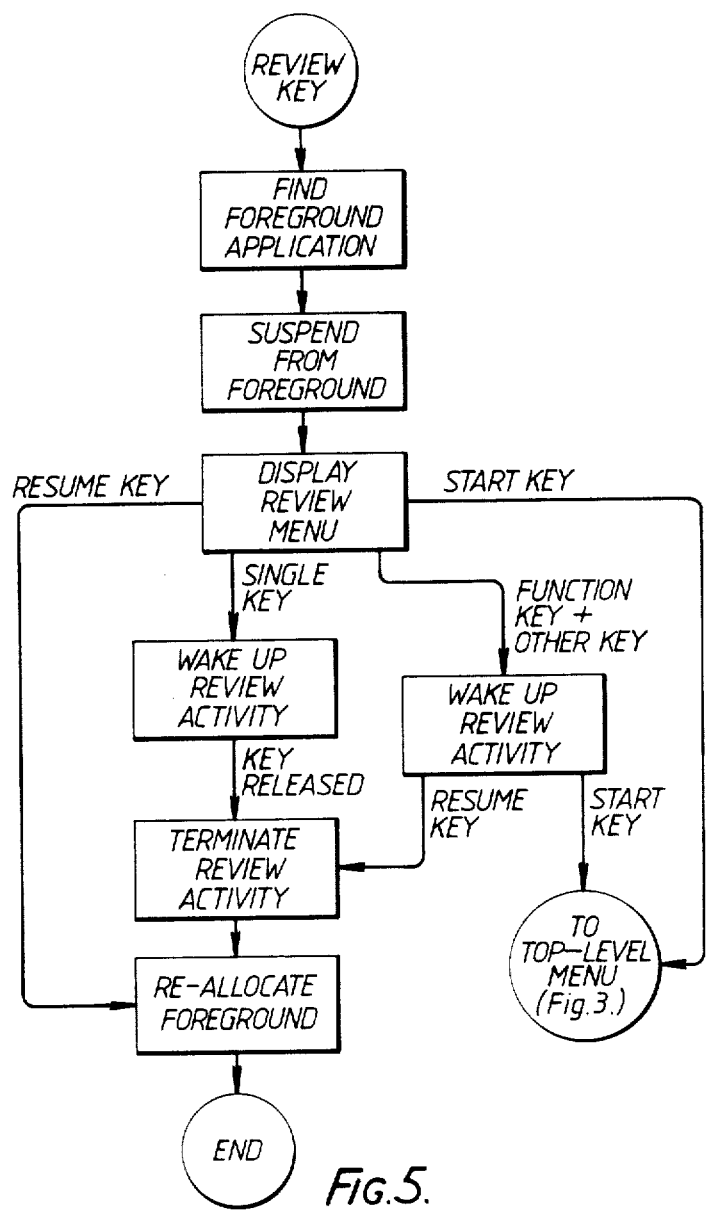

MULTI-PROGRAMMED DATA PROCESSING SYSTEM WITH FACILITY FOR INSPECTING STATE OF BACKGROUND PROGRAM

BACKGROUND TO THE INVENTION

This invention relates to data processing systems. The invention is particularly, although not exclusively, concerned with data processing systems of the kind usually referred to as personal computers. Such computers are normally used by non-computer-oriented persons, or inexperienced users. It is therefore desirable that they should provide functions which are natural in their operation and easy to use with little or no training and minimal reference to documentation.

Such a system may be designed to allow a plurality of different application programs to be executed concurrently. For example, it is possible to run a word processing program while at the same time running a program which is accessing a remote database. Normally, a personal computer is provided with just a single screen, to keep the cost to a minimum. In order to view the states of the different applications programs, it has been proposed to use a "windowing" technique, in which the screen is divided into a number of separate areas, each of which is allocated to a different program. Thus the user can, for example, refer to data retrieved from the database while using the word processing program. However, the windowing technique is inconvenient, since it introduces extra complexity in the system and restricts the screen area available to each program.

One object of the present invention is to provide a way of dealing with this problem which is more convenient than the windowing technique and which is suitable for use by the inexperienced user.

SUMMARY OF THE INVENTION

According to the invention, there is provided a data processing system arranged to execute a plurality of programs concurrently and having a display screen for displaying data associated with any one of the programs, characterised in that:
(a) each of the programs maintains display screen data indicating the current status of that program,
(b) the system maintains a review menu containing a list of those programs having display screen data currently available,
(c) the system has a manually operable review key which, when operated, causes the review menu to be displayed on the screen in place of any information currently displayed there, and
(d) the system has manual selection means, operable when the review menu is being displayed to select one of the programs listed on that menu and to cause the display screen data of the selected program to be displayed on the screen.

It can be seen that the REVIEW key thus allows a quick, unpremeditated inspection of the state of any selected program.

Preferably, when the review menu is displayed, the user can select one of the programs listed in the menu by pressing a single key, and the display screen data of the selected program is then displayed on the screen only for as long as the user holds down that key. However, the user preferably also has the option of pressing a different key or combination of keys to cause the selected display to be held on the screen, until it is specifically released e.g. by means of a further key operation.

The use of menus to guide the inexperienced user is known in itself. However, in conventional systems, the menu called up by the user is generally a high-level menu, showing all the available programs of the system. It is therefore usually necessary to display further, subsidiary menus, listing the options in more detail, before the user can make the final choice. In contrast, in the present system the menu which is displayed as a result of pressing the REVIEW key is one specially constructed for this purpose, and contains only those programs which currently have displays available for viewing.

In a personal computer, it is desirable for the user to be able to initiate new application programs at will as the need arises, with the minimum of complication and effort. In the system described herein, this facility is provided by means of a further manually operable key (the "START key") which, when operated, and causes the screen to display a menu indicating available application programs, allowing one of those programs to be selected for execution by the system.

Preferably, at any given time one of the programs is allocated to a foreground mode in which it is allowed to access the screen, the other programs all being allocated to a background mode in which they are not allowed to access the screen. The system conveniently includes a further manually operable key (the "RESUME key") which when operated, causes the current foreground program to be put into the background mode and causes the background program if any to become the new foreground program in its place or, if there is more than one background program currently waiting to use the screen, displays a menu indicating which programs are so waiting.

Thus, it can be seen that the START and RESUME keys provide a convenient mechanism to allow the user to initiate new programs and to return to a previous program as required.

Preferably, the programs are divided into two categories, extended and transient, and the operation of the START or RESUME key causes the current foreground program to be automatically terminated if it is transient, but allows that program to continue running as a background program if it is extended. This is convenient, since it means that, in the case of a transient program, the user does not have to specifically terminate it when he switches to another program.

BRIEF DESCRIPTION OF THE DRAWINGS

One data processing system in accordance with the invention will now be described by way of example with reference to the accompanying drawings.

FIGS. 3,4 and 5 are state diagrams of an application handler mechanism.

OVERALL VIEW OF THE SYSTEM

Figure 1:
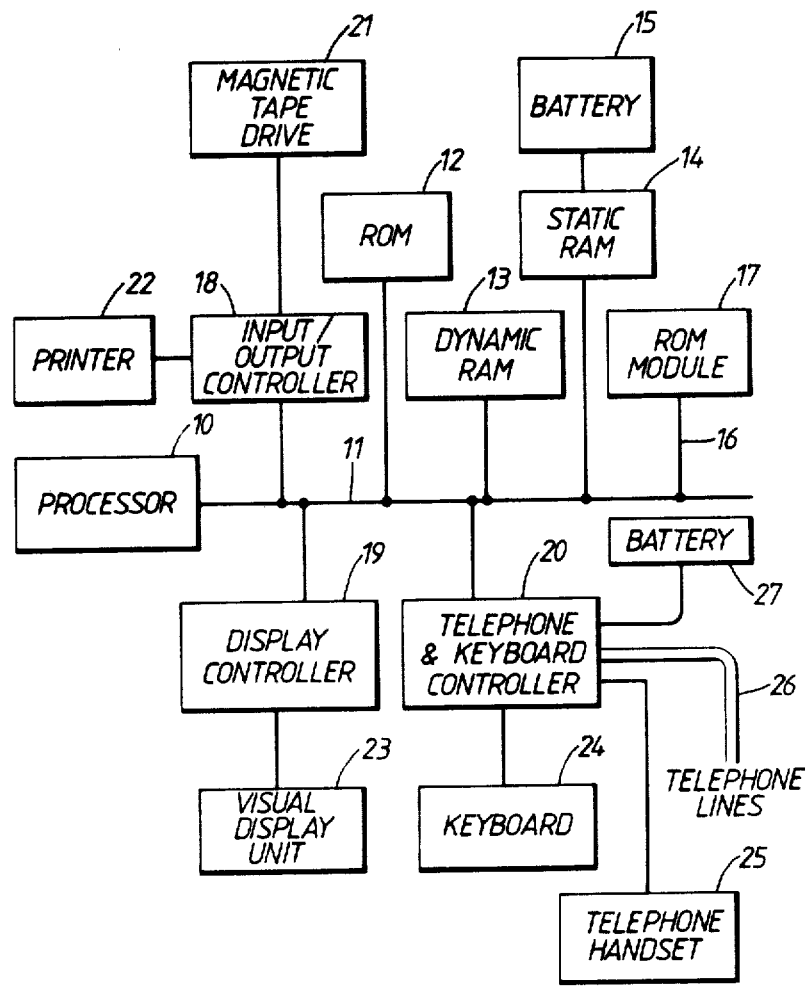
FIG. 1 is a block diagram of the system.

Referring to FIG. 1, the system is based on a microprocessor 10 which acts as the central processing unit. In the present system, the microprocessor is a Motorola MC68008, operating at a clock rate of 7.5MHz. The microprocessor 10 is connected to a bus 11 which carries data, addresses and control signals.

The bus 11 is connected to a 128K byte ROM 12, a 128K byte dynamic RAM 13, and a 2K byte static RAM 14. The static RAM is provided with a back-up battery 15 so that data in it is preserved when the system is powered down. The bus 11 is also connected to a socket 16 for receiving a plug-in ROM module 17. This can be used to supply optional software packages as required.

The bus 11 is also connected to an input/output controller 18, a display controller 19, and a telephone and keyboard controller 20. The input/output controller 18 controls a pair of magnetic tape drive units 21 (only one shown) of the kind using endless loop magnetic tape cartridges as removable storage media. The unit 18 also controls a printer 22. The display controller 19 is connected to a visual display unit 23, having a CRT screen for viewing by the system user. The telephone and keyboard controller 20 supervises a keyboard 24, telephone handset 25 and two telephone lines 26.

The keyboard contains all the usual keys, arranged in the conventional QWERTY layout, and also includes special system keys, labelled START, RESUME and REVIEW, the function of which will be described in detail later. The keyboard also includes a numeric keypad of the type used in push-button telephones. The controller 20 uses this keypad, in conjunction with the handset 25 and telephone lines 26, to allow the user to make and receive telephone calls in the conventional manner. It also allows the system to transmit and receive data over the lines 26.

The controller 20 continuously monitors the keyboard 24 and whenever it detects a change of state of any of the keys, it produces an interrupt signal to the processor 10. The controller 20 has a back-up battery 27, which allows the voice telephony function to continue even when the system is powered down.

Multi-tasking

The system is designed to allow multi-tasking: i.e. a number of different tasks or processes (herein referred to as "activities") can be executed concurrently. Actually, the processor 10 can only execute one activity at a time, and multi-tasking is achieved by rapidly switching between the different activities so as to give the impression that they are all being executed simultaneously.

Scheduling and co-ordination of the activities is carried out by an item of system software referred to as the kernel, which runs on the processor 10. The kernel also provides low-level management of the various parts of the system, including handling of interrupts from the controllers 18,19,20.

Each activity has its own stack and register values which are held in an area of the RAM 13 allocated to that activity. When the kernel selects an activity to run, it loads the register values of that activity into the actual registers of the processor 10, and then passes control of the processor to that activity. The activity then runs until either:
(a) it completes its processing task,
(b) it reaches a point where it must wait for a response from some other part of the system, or
(c) an interrupt signal is received.

The interrupt may be from one of the controllers 18, 19,20, requesting some service, or may be a time-out interrupt, indicating that the current activity has used up its time allocation. When any of these events occurs, the kernel takes over again, examines any interrupts present, and decides which activity should be selected next.

Each activity has a 32-bit event register held in its allocated area of RAM. Any activity can request the kernel to set one of the bits in the event register of another activity. When an activity runs, it can test the bits of its event register, and can take different actions according to their settings; for example, it can decide to wait until a bit has been set before taking a particular action. This provides a means for communication between activities.

Control programs for multi-tasking systems are well known in the art and so it is not necessary to describe the kernel in any greater detail.

Application programs

The user of the system will require to run one or more application programs. These may either be supplied with the system, or written by the user, or purchased from a third party. Application programs may include, for example, programs for word processing, spread sheet analysis, data base management, and message handling. These application programs can be provided as standard items in the ROM 12, or can be supplied as options in the form of ROM modules 17. Alternatively, they can be supplied on magnetic tape cartridges, and loaded into the RAM 13 from the tape drive unit 21 when required.

Each application program is treated by the system as one or more activities, which are scheduled by the kernel as described above. Hence, several application programs can be active concurrently in the system.

In general, application programs require to interact with the system user by means of the display screen 23 and keyboard 24. However, only one of the currently active applications is allowed to use the screen and keyboard at any given time. This is referred to as the foreground application and is said to be running in foreground mode. Any other currently active applications are referred to as background applications, running in background mode. An application in background mode can continue to perform processing which does not require the use of the screen and keyboard: for example, it can continue to send and receive data over one of the telephone lines. However, if it reaches a stage where it requires to interact with the user before it can proceed any further, it makes a request to use the screen and keyboard, and then goes into a waiting state.

The system user can choose which of the applications is to be in the foreground mode, by use of the START and RESUME keys, as will be described later.

Applications are classified as extended or transient. Transient applications are typified by relatively short access to the screen and keyboard to perform single updates or enquiries on data held in the system, and they are likely to be invoked at unpredictable times while longer applications are running. An example of a transient application is one which provides a telephone directory service, where the user may wish to access the directory from time to time to look up a telephone number or to update an entry. When the user selects a new foreground application by operation of the START or RESUME keys, the assumption is that he has finished with the transient application and so it is terminated. This is a very convenient feature, since it allows the user to terminate such applications without the need for an explicit command.

Extended applications are typified by lengthy user interactions by way of the screen and keyboard. The user may wish to break off to perform other, more urgent, tasks while retaining the ability to return to the extended application. Thus, when the user selects a new foreground application by means of the START and RESUME keys, the extended application is not terminated but is simply put into the background mode, relinquishing the screen and keyboard until it is selected again as the foreground application. In the meantime, it can continue processing if appropriate.

Some applications may be wholly transient or wholly extended. However, some applications may be sometimes transient and sometimes extended. For example, a teletext program may be extended when handling connections to a teletext computer over the telephone line, but transient when displaying stored pages captured during a previous connection.

Figure 2:
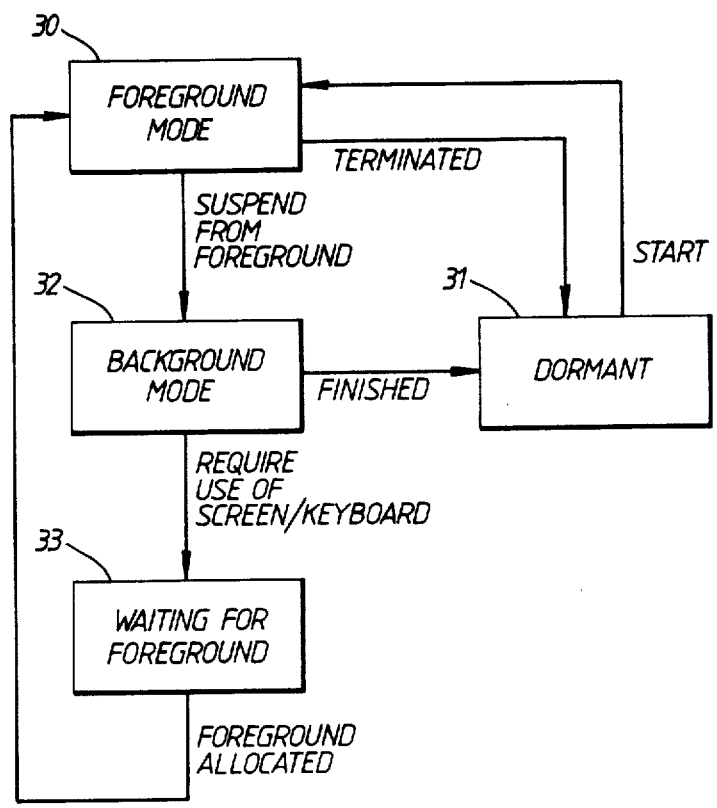
FIG. 2 is a state diagram of a typical application program.

Referring to FIG. 2, this is a state diagram of a typical application program. State 30 represents the foreground mode, in which the application is active and has access to the screen and keyboard. If the application is terminated, it immediately stops using the screen and keyboard. It may, however, continue running to complete any data transfers it may have been performing, so as to leave the data in a consistent state. It then goes into the dormant state 31. The application will remain in this state until it is restarted (by use of the START key). It will then request to be allowed to use the screen and keyboard, and when this request is granted, goes into the foreground mode.

If the application is suspended from the foreground mode (by use of the START or RESUME key) it immediately stops using the screen and keyboard. If it is an extended application, it then enters the background mode (state 32), in which it continues to run, without using the screen or keyboard. (In the case of a transient application, suspension from the foreground mode causes the application to go into the dormant state).

If the application completes its processing in the background mode, it terminates and goes into the dormant state 31. However, if it reaches a stage where it requires to use the screen or keyboard, it goes into a suspended state 33, waiting for the use of the screen and keyboard to be allocated to it. When they are allocated, the application returns to the foreground mode 30.

Application handler

The applications programs are supervised by a mechanism referred to as the application handler. The application handler may be a systems program, which runs on the processor 10 and is treated as an activity by the kernel, being multi-tasked with the other activities. Alternatively, the application handler could be implemented wholly or partly by means of hardware.

The application handler acts as a high-level scheduler, allowing the user to decide which applications are to be run and which of these is to be the foreground application, with access to the screen and keyboard. The user interacts with the application handler by means of the START, RESUME and REVIEW keys, as described below.

The application handler makes use of a table, referred to as the program table, which is held at a predetermined location in the RAM 13. This contains an entry for each application program currently known to the system. Each entry contains:
(a) the name of the application.
(b) its address, in ROM or RAM.
(c) an activity identifier, which is used by the kernel to identify the activity.
(d) status flags indicating the status of the application. These include flags to indicate whether or not the application has requested to be put into the foreground mode, whether the foreground has been allocated to it, and whether this is an extended or transient application.

When the system is initially powered up, the application handler puts a number of fixed entries into the program table, corresponding to those applications which are supplied as standard features of the system. The application handler then scans all addresses at which an application program might exist, whether in the ROM 12 or the plug-in ROM modules 17. Whenever it finds an application program at any of these addresses, it makes a corresponding entry into the program table. When requested by the user, it also reads the names of any application programs supplied on magnetic cartridge in the tape drive 21, and makes temporary entries in the program table for them.

The program table is updated by the application handler whenever it makes a scheduling decision (e.g. allocating the foreground mode to an application), and by the applications when they make a call to the application handler to notify it of a change of state (e.g. requesting to be put into the foreground mode).

Figure 3:
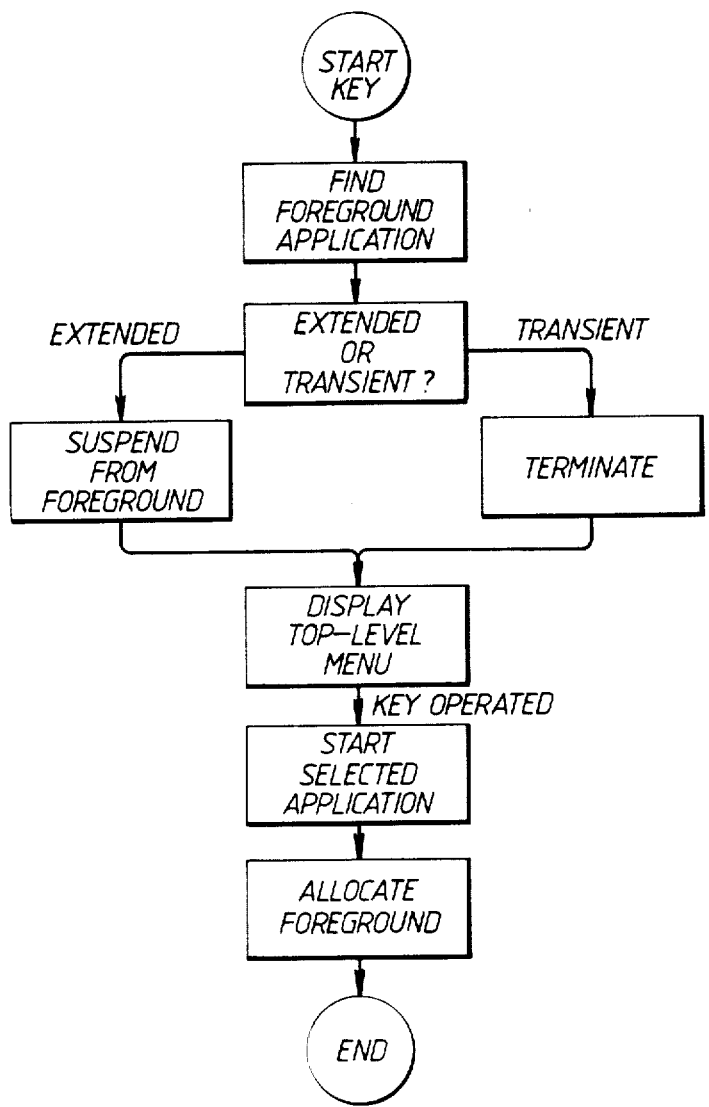
Figure 4:
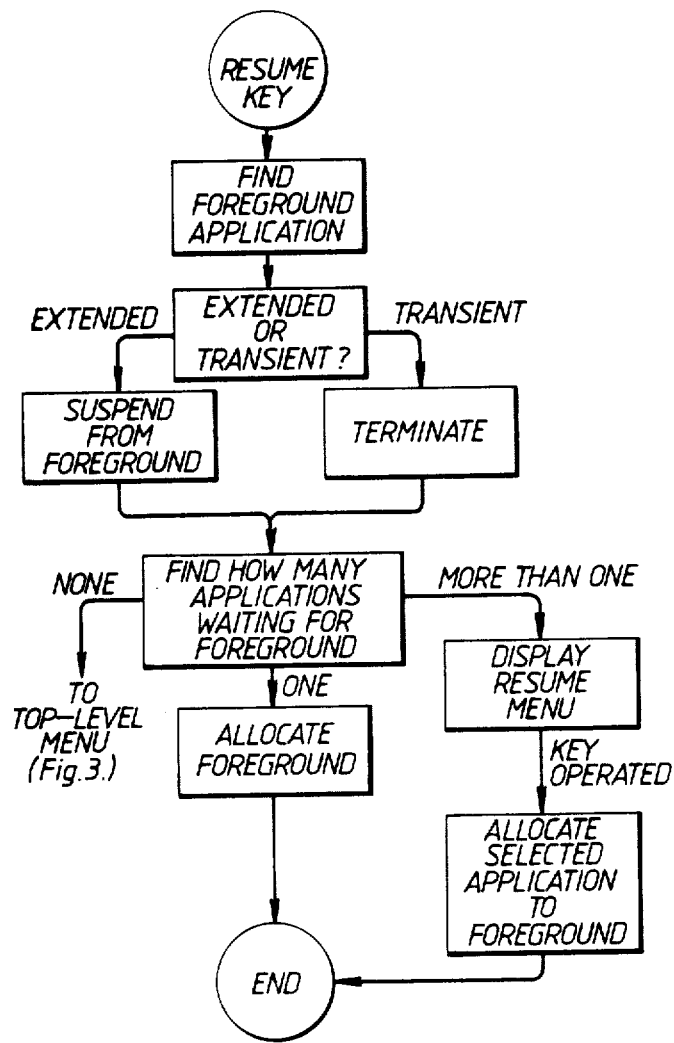

FIGS. 3,4 and 5 show a state diagram of those parts of the application handler relevant to the present invention.

START key

Referring to FIG. 3, when the START key is pressed, this is detected by the keyboard controller 20, which causes an interrupt in the processor 10. This is detected by the kernel, which informs the application handler by setting one of the bits in its event register.

The application handler then consults the program table to find which application is currently in the foreground mode, and whether it is extended or transient. If it is an extended application, the application handler sends it a message, instructing it to stop using the screen and keyboard. Alternatively, if the application is transient, the application handler sends it a message instructing it to terminate.

In either case, the application handler receives from the application an acknowledgement that it has stopped using the screen and keyboard. The application handler then uses the screen to display a top-level menu, listing all the applications that are currently available for running on the system. It then waits for another key to be pressed.

The user may select any of the applications listed in the top-level menu, by pressing the key indicated by the menu. (For example, a calculator program may be selected by pressing the "6" key). This is detected by the kernel and notified to the application handler. The application handler then requests the kernel to start up the selected application.

As soon as the selected application starts running, it sends a message to the application handler, requesting permission to go into the foreground mode, and also informing the application handler whether it is currently extended or transient. The application handler updates the program table, and sends a message back to the application, telling it that it has been allocated to the foreground mode.

Alternatively, when the top-level menu is displayed, the user may press a key which selects a subsidiary menu, listing further applications. This will lead the application handler into further states (not shown) which display the subsidiary menu and start the selected application.

RESUME key

Referring now to FIG. 4, when the RESUME key is pressed, the application handler again consults the program table to find which application is currently in the foreground mode, and whether it is extended or transient. If the foreground application is extended, it is suspended from foreground mode. If, on the other hand, it is transient, it is terminated. In either case, the next action of the application handler is to consult the program table to determine how many applications are waiting to go into the foreground mode.

If no application is waiting, the application handler causes the top-level menu to be displayed (FIG. 3), inviting the user to select a new application. If there is just one application waiting, that application is put into the foreground mode. Finally, if there is more than one application waiting, the application handler constructs a special resume menu, which lists all the applications waiting to be allocated to the foreground mode. This menu is displayed, allowing the user to choose one of those applications by pressing an appropriate key. The selected application is then put into the foreground mode.

It can be seen that the START and RESUME keys provide an efficient and convenient mechanism for the user to select new applications to be run, and to switch them between the foreground and background modes. For example, if the user is running one program, and wishes to break off to perform another, more urgent task, it is only necessary to press the START key and then to make the appropriate selection from the top-level menu which is displayed. When the user wishes to return to the original application program, it is only necessary to press the RESUME key, and the application will be restored to the foreground mode. If there is more than one application to which the user can return, he is presented with a menu from which to choose.

REVIEW key

The REVIEW key provides a mechanism which allows the user to make an unpremeditated inspection of data associated with an application. The REVIEW action has no permanent effect on the application which is reviewed, nor on any other application.

Each reviewable application contains a section of code which maintains a set of data referred to as the review screen, which is available for inspection during the REVIEW action. The choice of what data to include in the review screen is determined by the designer of the application: typically, it will be the current screen of the application, i.e. the one which would be displayed if the application were in the foreground mode. It might instead be a status report on the job being handled by the application.

Referring to FIG. 5, when the REVIEW key is pressed, the application handler consults the program table to find which application is currently in the foreground mode. It then suspends that application from the foreground so that it stops using the keyboard and screen. This applies to both extended and transient applications: the REVIEW key does not cause a transient application to terminate. The application handler then causes a special REVIEW menu to be displayed. This lists all the applications which currently have review screens available for inspection. The user can select one of these screens in two ways.

The first way is to press and hold down a single key, corresponding to the desired review screen as indicated on the review menu. For example, the review screen for the spread sheet program may be selected by pressing the "3" key. This causes the application handler to send a "wakeup" message to a special activity referred to as the review activity. This activity then runs, and causes the review screen of the selected application to be displayed on the screen of the display unit.

Meanwhile, the application handler checks, every tenth of a second, whether the key has been released. When the user releases the key, the application handler sends a "terminate" message to the review activity, causing it to go back into the dormant state. Finally, the application handler puts the application which was interrupted by the REVIEW sequence back into the foreground mode.

In summary, it can be seen that the review screen is displayed for as long as the user holds down the selected key. As soon as the key is released, the original application is returned to the screen.

The other way of selecting a review screen from the review menu is to press the "Function" key on the keyboard (this is a standard key on conventional keyboards) along with the numeric key on the keypad corresponding to the desired selection. For example, to select the spread sheet program in this way, the function key is pressed along with key "3" on the keypad. In this case, there is no need to hold down the keys—they can be released immediately. The review activity continues to run, and hence the review screen continues to be displayed even when the keys are released. This allows the user to inspect the review screen at leisure, and to perform other actions such as using the telephone facility. When the user wishes to return to the original application, he presses the RESUME key, which causes the application handler to terminate the review activity. The application which was interrupted by the REVIEW sequence is then restored to the foreground.

Alternatively, the user can press the START key, which causes the top-level menu to be displayed (FIG. 3).

Similarly, while the review menu is being displayed, the user can press the RESUME key, which causes the original application to be restored immediately, without viewing any review screen. Alternatively, he can press the START key, to cause the top-level menu to be displayed.

The use of the START key during the REVIEW operation, as described in the preceding two paragraphs, has the same effect on the interrupted application as at other times i.e. the application becomes suspended or is terminated, depending on whether it is extended or transient.

The current foreground application may itself have a review screen which can be displayed by use of the REVIEW key, and which may contain different information from that currently displayed by the application.

The REVIEW mechanism may also allow inspection of review screens containing data from applications which are not currently active i.e. which are dormant. For example, a telephone directory application may remember the most recently selected entry, and the REVIEW mechanism may allow this to be viewed even when the telephone directory application is dormant. For this purpose, when constructing the review menu, the application handler considers not only those applications which are active, but also those that are not active but may have associated stored data which is reviewable. This is achieved by an additional table maintained by the application handler, in which applications can declare the existence of such data.

What is claimed is:

1. A data processing system comprising:
   (a) means for executing a plurality of programs concurrently,
   (b) a display screen for displaying data associated with any one of the programs,
   (c) means for allocating any one of the programs to a foreground mode in which it is allowed to access the display screen and for allocating the other programs to a background mode in which they are not allowed to access the display screen,
   (d) means for maintaining, in respect of each of the programs currently in the background mode, display screen data indicating the current status of that program,
   (e) means for maintaining a review menu containing a list of those programs currently having display screen data available,
   (f) a manually operable review key,
   (g) means responsive to operation of the review key to cause said review menu to be displayed on the screen in place of information from the program currently in the foreground mode,
   (h) manually operable selection means,
   (i) means responsive to operation of said selection means when the review menu is being displayed, to select one of the programs listed on that menu and to cause the display screen data of the selected program to be displayed on the screen for as long as said selection means is operated, and
   (j) means responsive to release of said manually operable selection means to restore to the screen the information from the program currently in the foreground mode.

2. A system according to claim 1 wherein the manually operable selection means comprises a plurality of further keys, and wherein the means responsive to operation of said selection means is responsive to operation of a single one of said further keys to select one of the programs listed on the review menu and to cause the display screen data of the selected program to be displayed on the screen for as long as that further key is held.

3. A system according to claim 2 further including means responsive to operation of a different one or a combination of said further keys, for selecting one of the programs listed on the review menu and causing the display screen data of the selected program to be displayed on the screen and to be maintained on the screen after that key or combination of keys has been released.

4. A system according to claim 1 including:
   (a) means for maintaining a resume menu containing a list of programs currently in the background mode,
   (b) a manually operable resume key,
   (c) means responsive to operation of the resume key for causing the program currently in the foreground mode to be reallocated to the background mode and causing the resume menu to be displayed on the screen, and
   (d) means responsive to operation of the manually operable selection means while the resume menu is being displayed, to select one of the programs listed on that menu and to allocate the selected program to the foreground mode.

5. A system according to claim 1 including:
   (a) means for maintaining a start menu containing a list of programs not currently being executed but available for execution,
   (b) a manually operable start key,
   (c) means responsive to operation of the start key for causing the start menu to be displayed on the screen in place of any information currently displayed there, and
   (d) means responsive to operation of the manually operable selection means while the start menu is being displayed for selecting one of the programs listed on the start menu and causing that program to be executed.

6. A method of operating a data processing system comprising processing means, a display screen and a keyboard, the method comprising the steps:
   (a) executing a plurality of programs concurrently in the processing means,
   (b) maintaining, in respect of at least some of the programs, display screen data indicating the current status of the program,
   (c) maintaining a review menu containing a list of those programs currently having display screen data available,
   (d) in response to operation of a predetermined key on said keyboard, displaying the review menu on the screen,
   (e) in response to operation of a further key on said keyboard, while the review menu is being displayed, selecting one of the programs listed on the review menu and causing the display screen data of the selected program to be displayed on the screen, for as long as said further key is held, and
   (f) in response to release of said further key, restoring to the screen the information that was being displayed prior to operation of said predetermined key.

* * * * *